Patented Feb. 5, 1946

2,394,499

UNITED STATES PATENT OFFICE 2,394,499

WRINKLING OIL COMPOSITION

William A. Waldie, Dayton, Ohio, assignor to New Wrinkle, Inc., Dayton, Ohio, a corporation of Delaware No Drawing. Application January 3, 1942, Serial No. 425,543

20 Claims. (Cl. 260—25)

This invention relates to wrinkling oil composition, and more particularly deals with an oil composition possessing highly desirable wrinkling tendency and including a large proportion of non-wrinkling oil.

As is well known to those skilled in the art, China-wood oil is generally considered the best oil for the production of wrinkle compositions. This oil may be employed in its natural state or subsequent to blowing. Other drying oils such as oiticica, perilla, linseed, chia, lumbang, candlenut, hempseed, poppyseed, soya bean, fish, sunflower seed, walnut, etc. may be employed. Oiticica oil, like China-wood oil, may be used in its natural state or it may be blown prior to use, but all other drying oils mentioned must be blown to make them suitable for use as wrinkling oils.

In spite of the possibility of using blown drying oils as substitutes for China-wood oil (either raw or blown), these blown oils cannot be considered as true replacements inasmuch as, while they may take the place of China-wood oil in a given formula, the formula must be radically altered and the conditions for its treatment greatly modified in order to yield the same product as previously obtained with China-wood oil.

Of these drying oils which are considered as substitutes for China-wood oil, oiticica, linseed and perilla are those most widely used and the ones that yield the most satisfactory results. However, these oils, with the exception of oiticica, must be used in their blown state and possess certain disadvantageous characteristics. The temperature of the blowing operation being relatively low, a substantial quantity of air is believed to remain in the oil in a free or intermolecularly dispersed state. This air, which is not chemically combined with the oil, leads to auto-oxidation during storage, with the result that coating compositions produced with blown oils have a tendency to gel and precipitate out of solution. This leads to difficulties in applying the coating composition and particularly so when it is to be applied by spraying.

Oiticica oil is frequently mentioned as a true substitute or replacement for China-wood oil. However, those skilled in the art and having practical experience in the use of both oils know that this is not the case. In order to replace China-wood oil with oiticica oil, it is necessary to reformulate the composition wherein it is to be used and this reformulation is of a radial nature. If oiticica oil were to be a true substitute for China-wood oil, then a varnish maker should be able to replace the latter with the former without changing the cooking temperatures of any other procedure and still obtain identical results as to drying time, film qualities, etc. This, however, is not the case as will be made evident by the following formulae:

Example I

| | | |
|---|---|---:|
| Modified phenol resin | pounds | 100 |
| Lead acetate | do | 7 |
| China-wood oil | gallons | 18 |
| Linseed oil heat bodied to a Z-4 body | do | 2 |
| Solvesso #2 (petroleum diluent) | do | 10 |
| Toluol | do | 24 |
| Cobalt naphthenate 6% metal | do | ½ |

Example II

| | | |
|---|---|---:|
| Modified phenol resin | pounds | 100 |
| Lead acetate | do | 7 |
| Oiticica oil | gallons | 18 |
| Linseed oil heat bodied to a Z-4 body | do | 2 |
| Solvesso #2 (petroleum diluent) | do | 10 |
| Toluol | do | 24 |
| Cobalt naphthenate 6% metal | do | ½ |

In preparing coating compositions from each of the above formulations, 50 pounds of resin and all of the China-wood or oiticica oil are heated together to 540° F. and the batch then removed from the fire. The temperature will then rise slightly, but as soon as it has fallen again to 540° F., the kettle is put back on the fire and the temperature held at 540° F. until the batch shows a slight string from a stirring rod. The lead acetate is then added to check polymerization and directly thereafter the additional quantity of resin and the linseed oil are added. The entire batch is then heated quickly with stirring to 500° F., after which it is allowed to cool down to 350° F., whereupon the solvents and cobalt drier are added.

As will be noted, the proportions of ingredients and the treatment were the same in Examples I and II; however, the resulting compositions gave utterly dissimilar results. The product of Example I, when sprayed on a test panel, partially air-dried, and then baked at 230° F. for one hour, produced a uniform, well defined and well textured surface, while the product of Example II, when treated in the identical manner, produced a smooth, high gloss film.

It will thus be seen that the results obtained when China-wood oil and oiticica oil are used in the same general formulation and according to the same procedure yield results which are widely different. There are other dissimilarities which exist. For example, oiticica oil is a solid, while China-wood oil is a liquid. Both oiticica oil and China-wood oil include conjugated double bonds in their chemical structure, but the chemical structure of oiticica oil also includes a keto group which is not found in tung oil. Aside from the facts that both are expensive, that they come from relatively inaccessible localities, and that both fluctuate in quality and price, their only points of physical similarity are that they both dry to frosty films and have the property of gelling when heated; however, even here there are dissimilarities for oiticica oil may be heated considerably longer than China-wood oil before it gels.

I have determined, as evidenced by the result of Example II, that if oiticica oil is employed as a substitute for China-wood oil in a formulation for wrinkle coating composition which ordinarily requires a cooking temperature of 540° F., the oiticica oil will lose its ability to dry to a wrinkle texture. I have further determined that I am able substantially to reduce the processing cost by utilizing temperatures in the neighborhood of 450° F. when using oiticica oil and obtain a satisfactory wrinkle finish after baking. At this low cooking temperature the results obtained with China-wood oil would be substantially worthless.

of my invention, I am able substantially to reduce the raw material cost and to a lesser extent the processing cost.

Using oiticica oil as wrinkle oil, I am able to substitute as much as 50 per cent of heat bodied linseed oil without destroying the wrinkling power of the mixture; in fact, in many instances I am able to obtain a more uniform and better defined texture according to my invention than it is possible to obtain by the use of straight oiticica oil.

In carrying out my invention, I prefer to use heat bodied linseed oil having a Gardner-Holdt viscosity of U for the purpose of reducing the time necessary to give the mixture of oiticica oil and linseed oil the required body. However, I am able to make use of the so-called varnish grade of linseed oil, but in such case, the heating time required to produce a slight string on a stirring rod would have to be substantially increased.

The mixture of oiticica oil and heat bodied linseed oil is subjected to heat treatment to increase its body and is then further processed in the presence of the proper type of resin, and with the addition of suitable bottom and top driers and solvents, a wrinkle coating composition is obtained. Details of proportions employed in a number of tests are tabulated in Table I as follows:

Table

| Test No. | Resin [1] | Oil (gals.) | | | Solvent (gals.) | | | Cobalt drier, gals. | Oil length, gals. | Gardner-Holdt viscosity | Per cent non-wrinkling oil |
|---|---|---|---|---|---|---|---|---|---|---|---|
| | | Oiticica | Linseed | Borated linseed [2] | Xylol | Solvesso | Naptha [3] | | | | |
| 1 | Durez-219 | 18 | | | 19 | | 19 | ½ | 18 | A | 0 |
| 2 | Durez-220 | 30 | | | | 48 | | ¾ | 30 | M | 0 |
| 3 | Amberol-F7 | 25 | | | | 40 | | ¾ | 25 | R | 0 |
| 4 | (4) | 25 | | | | 40 | | ¾ | 25 | I | 0 |
| 5 | Amberol-F7 | 16 | 4 | | | 16 | 16 | ½ | 20 | O | 20 |
| 6 | do | 12 | 8 | | | 16 | 16 | ½ | 20 | G | 40 |
| 7 | do | 12 | 8 | | | 16 | 16 | ½ | 20 | L | 40 |
| 8 | do | 12 | | 8 | | 16 | 16 | ½ | 20 | T | 40 |
| 9 | do | 12 | 3 | | | 16 | 16 | ⅜ | 15 | M | 20 |
| 10 | do | 9 | 3 | | | 12 | 12 | ⅜ | 12 | M | 25 |
| 11 | do | 6 | 6 | | | 12 | 12 | ⅜ | 12 | E | 50 |
| 12 | do | 7½ | | 4½ | | 12 | 12 | ⅜ | 12 | T | 37½ |
| 13 | do | 5 | | 3 | | 12 | 12 | ¼ | 8 | G | 37½ |

[1] 100 lbs. resin used in every test.
[2] Borated linseed oil prepared by mixing 6 lbs. manganese borate with ¼ gal. of varnish grade linseed oil and then adding the mixture to 60 gals. of heat bodied (Z-4 visc.) linseed oil heated to 350° F. Temperature is then increased to 520° F., the oil removed from fire, and allowed to cool and settle. The supernatant liquid is used.
[3] V. M. and P. grade.
[4] 75% Amberol-F7 and 25% limed lead resinate prepared by melting 100 lbs. W. W. rosin at 400° F., adding slowly thereto 4 lbs. lead acetate, heating the mixture to 450° F. until a clear drop forms on glass, and then sifting in 4½ lbs. lime flour. The batch is then heated to 525° F. until a clear drop forms on glass, and the resinate is then cooled and hardened.

Both China-wood oil and oiticica oil, as has been mentioned hereinbefore, are costly oils obtained from relatively inaccessible localities. The quality of each is subject to fluctuation and the constancy of supply is problematical under war conditions. The problem confronting the industry has been to produce a satisfactory wrinkle coating composition utilizing oils which may be considered as staple commodities and which are not subjected to substantial price and quality fluctuations and which may be obtained from domestic sources.

According to my invention, I have been successful in substituting substantial quantities of readily obtainable nonwrinkling oils in the formulation of wrinkle coating compositions which exhibit extremely valuable characteristics.

According to my invention, I am able to produce a wrinkle coating composition using as much as 50 per cent of nonwrinkling oils obtainable from domestic sources. Furthermore, in the practice In preparing the coating compositions represented by the various tests summarized in Table I, the oil was heated to a temperature of substantially 450 to 460° F. and held at substantially that temperature for a period of from 30 to 45 minutes. The resin was then added and melted in. This caused a drop in the temperature and the batch was heated back to approximately 450° F. and held at that temperature for approximately 15 minutes. It was then removed from the fire and allowed to cool to 400° F. The petroleum diluent was added, and a marked reduction in the temperature of the batch noted. Thereafter, the cobalt drier and balance of the solvent was added to the batch. The resulting product, after cooling to ambient temperature, was ready for use as a sprayable coating composition adapted to produce a wrinkle finish characterized by hardness and toughness of film and extreme regularity and fineness of texture.

Test panels were prepared by spraying the coating composition on a metal plate, allowing the film to come to the "set" stage, and then baking at 230 to 240° F. for periods of from 45 to 60 minutes. In every instance the wrinkle produced was of uniform size and pleasing texture. In no case was the resulting wrinkle inferior to that obtained using straight China-wood oil or straight oiticica oil.

It will be noted that Amberol-F7 was used in the majority of the tests summarized in Table I. This is a rosin modified phenol formaldehyde type of resin. Other resins of the same general type make be used in place of Amberol-F7 so long as they are oil soluble and non-reactive. The term "non-reactive" is used in the sense employed by Siddle in "Varnish Making," 1940 (Chemical Publishing Co., pages 121 and 122). By "reactivity" is meant the liberation of water and formaldehyde on cooking with drying oils. Such resins are widely known by trade names such as Beckacite, Durez, Para-dura, Durite, Locto, Paranol, Varcum, etc.

It will be understood by those skilled in the art that other nonwrinkling drying oils of the general type represented by linseed oil may be substituted for linseed oil in the practice of my invention, including those hereinbefore mentioned.

While the petroleum diluent used was what is generally known as "Varnish Makers and Painters Naphtha," the selection of thinners is not critical, although preference should be given to those products of high volatility such as light naphtha, toluol, xylol, etc. Of course, a small quantity of low volatility solvent may prove of value to bring about a sudden chilling of a batch in order to check the bodying thereof in the event that it should have been heat treated and bodied a trifle too long.

"Solvesso" is the trade name of a hydrogenated naphtha of high solvency which is manufactured by Standard Oil Company and is a solvent well known to those skilled in this art.

Likewise, many different driers may be used but preference should be given to those commonly known as top driers and which tend to form the surface skin which is so desirable in wrinkle compositions. The resinate, linoleate, or naphthenate type of drier, characterized by ready solubility, proves very suitable for this purpose.

In addition to the rosin modified phenol aldehyde type of resin hereinbefore mentioned, rosin modified alkyd resins such as maleic acid resin may be used satisfactorily, and it will be understood that other polybasic acids or their anhydrides, including phthalic, tartaric, citric and malic may be substituted for the maleic acid or anhydride, although the rosin modified maleic acid resin is preferred from among the alkyd resins for use in the practice of my invention.

Furthermore, natural resins such as Congo, Kauri, Batu, Zanzibar, oil soluble Manila, Pontianak, etc. may be employed, but where such natural resins are used they should first be "run" to make them oil soluble and the first step of the procedure hereinbefore described would have to be altered accordingly. In such case the resin would first be fused, a portion of the heat treated oil mixture added to it, the temperature raised to a point sufficient to dissolve the resin in the oil, and thereafter the balance of the heat treated oil mixture added to the batch. This modification, however, need not to be followed faithfully, since those skilled in the art will understand that other methods of incorporating the heat treated resin into the heat treated oil mixture may be utilized so long as proper solution or melting of the resin in the oil is brought about.

It will be understood that metal driers other than cobalt compounds may be used such as those of manganese. The inherent characteristic of the drier to be used is its ability to bring about a rapid formation of a skin on the exposed surface of the film in order to cause the changes in volume between the surface of the film and the interior thereof which lead to the production of a wrinkle surface.

Wrinkle coating compositions resulting from the practice of my invention may be further compounded with pigment ground in oil vehicle for the purpose of producing wrinkling enamels, and texture modifying ingredients may be added thereto. Such pigments, namely titanium oxide, asbestine, silica, Silex, whiting, calcium carbonate, china clay, chrome green, blanc fixe, magnesium carbonate, and diatomaceous earth, and texture modifying ingredients, namely, drying oil fatty acid solutions, as well as other driers, namely manganese borate, which may be substituted for that used in the tests summarized in Table I, were broadly disclosed in my Patent No. 2,294,703 issued September 1, 1942; Patent No. 2,344,189, issued March 14, 1944; Patent No. 2,268,002, issued December 30, 1941; and Patent No. 2,275,239, issued March 3, 1942; and in my copending applications, Serial No. 271,592, filed May 3, 1939; Serial No. 297,162, filed September 29, 1939; and Serial No. 421,769, filed December 5, 1941.

It will be understood that the heating times hereinbefore specified will vary depending on the size of the batch being treated and that necessary adjustment of the time element must be made in the practice of my invention.

It will be understood that while I have set forth certain specific embodiments of my invention, it is not my intention to have my invention limited to or circumscribed by the specific details of procedure and proportions indicated in view of the fact that my invention is adapted to changes according to individual preference and conditions without departing from the scope thereof as defined in the appended claims.

I claim:

1. The method of making wrinkle varnish composition which comprises heat bodying a mixture of 80–50% oiticica oil and 20–50% unblown non-conjugated double-bonded drying oil at approximately 450–460° F., and adding thereto resin selected from the group consisting of run natural resins requiring running for the production of oil-solubility, rosin-modified alkyd resins, and oil-soluble phenol-aldehyde resins which do not evolve formaldehyde and water on cooking with drying oil and a top drier.

2. The method of making wrinkle varnish composition which comprises heat bodying a mixture of 80–50% oiticica oil and 20–50% unblown non-conjugated double-bonded drying oil at approximately 450–460° F., and adding thereto resin selected from the group consisting of run natural resins requiring running for the production of oil-solubility, rosin-modified alkyd resins, and oil-soluble phenol-aldehyde resins which do not evolve formaldehyde and water on cooking with drying oil and a cobalt drier.

3. The method of making wrinkle varnish composition which comprises heat bodying a mixture of 80–50% oiticica oil and 20–50% unblown non-conjugated double-bonded drying oil at approximately 450–460° F., and adding thereto rosin modified phenol aldehyde resin which is oil-soluble and does not evolve formaldehyde and water on cooking with drying oil and a top drier.

4. The method of making wrinkle varnish composition which comprises heat bodying a mixture of 80–50% oiticica oil and 20–50% unblown non-conjugated double-bonded drying oil at approximately 450–460° F., and adding thereto rosin modified phenol aldehyde resin which is oil-soluble and does not evolve formaldehyde and water on cooking with drying oil and cobalt drier.

5. The method of making wrinkle varnish composition which comprises heat bodying a mixture of 80–50% oiticica oil and 20–50% unblown non-conjugated double-bonded drying oil at a temperature of substantially 450 to 460° F. for time sufficient to give a viscosity which produces a slight string on a stirring rod, adding thereto resin selected from the group consisting of run natural resins requiring running for the production of oil-solubility, rosin-modified alkyd resins, and oil-soluble phenol-aldehyde resins which do not evolve formaldehyde and water on cooking with drying oil, heating for an additional period sufficient to disperse the resin at a temperature of substantially 450 to 460° F., cooling to approximately 400° F., and adding thereto hydrocarbon thinner and a top drier to produce a sprayable composition adapted to give a wrinkle surface when applied and dried.

6. The method of making wrinkle varnish composition which comprises heat bodying a mixture of 80–50% oiticica oil and 20–50% unblown non-conjugated double-bonded drying oil at a temperature of substantially 450 to 460° F. for time sufficient to give a viscosity which produces a slight string on a stirring rod, adding thereto a rosin modified phenol aldehyde resin which is oil-soluble and does not evolve formaldehyde and water on cooking with drying oil, heating for an additional period sufficient to disperse the resin at substantially 450 to 460° F., cooling to approximately 400° F., and adding thereto hydrocarbon solvent and a cobalt drier to produce a sprayable composition adapted to give a wrinkle surface when applied and dried.

7. The method of making wrinkle varnish composition which comprises heat bodying a mixture consisting of from 50 to 80 per cent of oiticica oil and from 20 to 50 per cent of heat bodied unblown normally non-conjugated double-bonded drying oil at a temperature of substantially 450 to 460° F. for time sufficient to give a viscosity which produces a slight string on a stirring rod, adding thereto resin selected from the group consisting of run natural resins requiring running for the production of oil-solubility, rosin-modified alkyd resins, and oil-soluble phenol-aldehyde resins which do not evolve formaldehyde and water on cooking with drying oil, heating for a further period sufficient to disperse the resin at a temperature of substantially 450 to 460° F., cooling to approximately 400° F., and then adding hydrocarbon solvent and an oil soluble drier to produce a sprayable composition adapted to give a wrinkle surface when applied and dried.

8. The method of making wrinkle varnish composition which comprises heat bodying a mixture consisting of from 50 to 80 per cent of oiticica oil and from 20 to 50 per cent of heat bodied linseed oil at a temperature of substantially 450 to 460° F. for time sufficient to give a viscosity which produces a slight string on a stirring rod, adding thereto resin selected from the group consisting of run natural resins requiring running for the production of oil-solubility, rosin-modified alkyd resins, and oil-soluble phenol-aldehyde resins which do not evolve formaldehyde and water on cooking with drying oil, heating for a further period sufficient to disperse the resin at a temperature of substantially 450 to 460° F., cooling to approximately 400° F., and then adding hydrocarbon solvent and an oil soluble drier to produce a sprayable composition adapted to give a wrinkle surface when applied and dried.

9. As a new article of manufacture, a wrinkling oil composition comprising a mixture bodied at approximately 450–460° F. of wrinkling oil and unblown normally non-conjugated double-bonded vegetable drying oil consisting of from 50 to 80 per cent oiticica oil and from 20 to 50 per cent heat bodied linseed oil.

10. The method of making a wrinkling oil composition which comprises heating a mixture of 80–50% oiticica oil and 20–50% unblown normally non-conjugated double-bonded drying oil at a temperature of substantially 450 to 460° F. for a period of approximately 30 to 45 minutes.

11. The method of making a wrinkling oil composition which comprises heating a mixture consisting of from 50 to 80 per cent oiticica oil and from 20 to 50 per cent heat bodied linseed oil at a temperature of substantially 450 to 460° F. for a period of approximately 30 to 45 minutes.

12. The method of making a wrinkle coating composition which comprises cooking a mixture of 80–50% oiticica oil and 20–50% heat bodied linseed oil said mixture having been heat treated at approximately 450–460° F. with wrinkling resin selected from the group consisting of run natural resins requiring running for the production of oil-solubility, rosin-modified alkyd resins, and oil-soluble phenol-aldehyde resins which do not evolve formaldehyde and water on cooking with drying oil, and adding to the resulting product metallic drier and solvent.

13. The method of making a wrinkle coating composition which comprises cooking a mixture of 80–50% oiticica oil and 20–50% heat bodied linseed oil said mixture having been treated at approximately 450–460° F. with rosin modified phenol aldehyde resin which is oil-soluble and does not evolve formaldehyde and water on cooking with drying oil, and adding to the resulting product metallic drier and solvent.

14. A wrinkle coating composition comprising the heat reaction product of wrinkle resin selected from the group consisting of run natural resins requiring running for the production of oil-solubility, rosin-modified alkyd resins, and oil-soluble phenol-aldehyde resins which do not evolve formaldehyde and water on cooking with drying oil and a mixture heat treated at approximately 450–460° F. of 80–50% oiticica oil and 20–50% heat bodied linseed oil in admixture with metallic drier and solvent.

15. A wrinkle coating composition comprising the reaction product of rosin modified phenol aldehyde resin which is oil-soluble and does not evolve formaldehyde and water on cooking with drying oil and a mixture heat treated at approximately 450–460° F. of 80–50% oiticica oil and 20–50% heat bodied linseed oil in admixture with metallic drier and solvent.

16. The method of making wrinkle varnish composition which comprises heat bodying a mixture of 80 to 50% oiticica oil and 20 to 50% unblown non-conjugated double-bonded drying oil at approximately 450 to 460° F., and adding thereto rosin-modified alkyd resin and a top drier.

17. A wrinkle coating composition comprising the heat reaction product of wrinkle resin selected from the group consisting of run natural resins requiring running for the production of oil-solubility, rosin-modified alkyd resins, and oil-soluble phenol-aldehyde resins which do not evolve formaldehyde and water on cooking with drying oil and a mixture heat-treated at approximately 450 to 460° F. of 80 to 50% oiticica oil and 20 to 50% unblown, non-conjugated double-bonded drying oil in admixture with metallic drier and solvent.

18. A wrinkle coating composition comprising the heat reaction product of oil-soluble, rosin-modified phenol-aldehyde resin which does not evolve formaldehyde and water on cooking with drying oil and a mixture heat-treated at approximately 450 to 460° F. of 80 to 50% oiticica oil and 20 to 50% unblown, non-conjugated double-bonded drying oil in admixture with metallic drier and solvent.

19. A wrinkle coating composition comprising the heat reaction product of rosin-modified alkyd resin and a mixture heat-treated at approximately 450 to 460° F. of 80 to 50% oiticica oil and 20 to 50% unblown, non-conjugated double-bonded drying oil in admixture with metallic drier and solvent.

20. As a new article of manufacture, a wrinkling oil composition comprising a mixture bodied at approximately 450 to 460° F. of from 50 to 80 percent of oiticica oil and from 20 to 50 percent of unblown, non-conjugated double-bonded drying oil.

WILLIAM A. WALDIE.